(12) United States Patent
De Stasi

(10) Patent No.: US 7,863,869 B1
(45) Date of Patent: Jan. 4, 2011

(54) MULTIPLE LEVEL CURRENT REGULATOR

(75) Inventor: Frank De Stasi, San Leandro, CA (US)

(73) Assignee: National Semiconductor Corporation, Santa Clara, CA (US)

(*) Notice: Subject to any disclaimer, the term of this patent is extended or adjusted under 35 U.S.C. 154(b) by 338 days.

(21) Appl. No.: 11/749,696

(22) Filed: May 16, 2007

(51) Int. Cl.
*G05F 1/00* (2006.01)
(52) U.S. Cl. .................................. 323/222; 323/285
(58) Field of Classification Search .............. 323/222, 323/282, 283, 284, 285; 315/291
See application file for complete search history.

(56) References Cited

U.S. PATENT DOCUMENTS

| | | | |
|---|---|---|---|
| 6,329,727 B1* | 12/2001 | Traveis et al. ............... | 307/115 |
| 6,586,890 B2 | 7/2003 | Min et al. | |
| 6,683,419 B2 | 1/2004 | Kriparos | |
| 6,836,081 B2 | 12/2004 | Swanson et al. | |
| 6,844,760 B2 | 1/2005 | Koharagi et al. | |
| 7,317,403 B2* | 1/2008 | Grootes et al. ......... | 340/815.45 |
| 7,375,472 B2* | 5/2008 | Wong et al. ................. | 315/307 |
| 2007/0114951 A1* | 5/2007 | Tsen et al. ................... | 315/291 |
| 2008/0164828 A1* | 7/2008 | Szczeszynski et al. ...... | 315/300 |

OTHER PUBLICATIONS

National Semiconductor Corporation, LM3510 Datasheet: Step-Up Converter for *High and Low Power White LED* Applications, Oct. 2004.

Maxim Integrated Products, MAX1583 Datasheet: White LED Camera/Flash Boost Converter, Aug. 2005, 9 pages.

Bruce Ferguson, LX1995 LED Driver: Camera Flash Application AN-30, Apr. 5, 2004, 2 pages, Microsemi Integrated Products, Garden Grove, CA.

Szolusha, Keith, Tiny, Efficient High Power LED Camera Flash Solutions for Cell Phone Applications, Design Note 1009, Linear Techonology, 2004, 2 pages, Milpitas, California.

Hill, Jim, NCP 1421/2 Reference Designs for High-Power White LED Flash Applications, AND8171/D, ON Semiconductor, Nov. 2004, 6 pgs., Literature Distribution Center for ON Semiconductor, Phoenix, AZ.

Rohm, Silicon Monolithic Integrated Circuit, Flash LED Driver for Mobile Phone with Camera, Apr. 18, 2005, 6 pages, Rohm Co., Ltd.

MPS, MP1529 Fixed Frequency Step-Up Converter LCD Backlight Plus Flash, Nov. 23, 2005, pp. 1-14, www.MonolithicPower.com.

(Continued)

*Primary Examiner*—Harry Behm
*Assistant Examiner*—Matthew Grubb
(74) *Attorney, Agent, or Firm*—Frommer Lawrence & Haug LLP; Matthew M. Gaffney

(57) ABSTRACT

A circuit for selectively regulating a current at one value from multiple defined values. The circuit includes a sense selector to select a current sense signal from multiple current sense signals and a current path selector to select a current pathway from multiple current pathways. Each current pathway is associated with a resistance value. The resistance value of the selected current pathway, in part, defines the value at which the output current is regulated to.

23 Claims, 6 Drawing Sheets

OTHER PUBLICATIONS

Wong, L.K., Leung, F.H.F., Tam, P.K.S., Chan, K.W., Design of an Analog Fuzzy Logic Controller for a PWM Boost Converter, Department of Electronic Enineering, The Hong Kong Polytechnic University, pp. 360-363, Hung Horn, Hong Kong.

Gabrielli, A., Gandolfi, E., Masetti, M., Maloberti, F., Design and Preliminary Results of High Speed Analog 1.0 µm CMOS Min-Max Circuit for Fuzzy Architectures, 1996, pp. 381-384, Italy.

Samman, F. A., Sadjad, R.S., Analog MOS Circuit Design for a Reconfigurable Fuzzy Logic Controller, Department of Electrical Engineering, 2002, pp. 151-156, Hasanuddin Univeristy, Makassar.

Yamakawa, T., A Fuzzy Inference Engine in Nonlinear Analog Mode and Its Application to a Fuzzy Logic Control, IEEE Transactions on Neural Networks, vol. 4, No. 3, May 1993, 27 pgs., Fukwoka, Japan.

National Semiconductor Corporation, LM3510 Datasheet: Step-Up Converter for High and Low Power White LED Applications, Oct. 2004.

National Semiconductor Corporation, LM3557 Datasheet: Step-Up Converter for White LED Applications.

* cited by examiner

MULTIPLE LEVEL CURRENT REGULATOR

TECHNICAL FIELD

The invention is generally directed to the area of the current regulation. The invention is directed, particularly, but not exclusively to an apparatus and a method for regulating an output current to one value which is selected from multiple defined values.

BACKGROUND

Certain electronic devices and circuits employ current regulators to provide a relatively constant current. Electronic devices and circuits such as computers, televisions, mobile devices, wireless devices, illumination devices, phase lock loops, motors, and/or the like, may benefit from current regulation. For example, current regulation may be employed to maintain a substantially constant illumination intensity or color from an illumination device, to provide a substantially constant frequency output from a phase lock loop, to regulate the speed of a motor, and/or the like.

In certain applications, it may be beneficial to selectively regulate a current at different values at different times. For example, such selectable regulation may be employed to enable an illumination device to provide multiple intensity levels, to enable a motor to run various speeds, to enable a microprocessor to process instructions at differing frequencies, to enable a wireless device to transmit at multiple power levels, and/or the like. Embodiments of the invention may be employed in these and other applications.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention is related to a circuit and a method for selectively regulating a current at one value from multiple defined values. The circuit and method include a sense selector to select a current sense signal from multiple current sense signals and a current path selector to select a current pathway from multiple current pathways. Each current pathway is associated with a resistance value. The resistance value of the selected current pathway, in part, defines the value at which the output current is regulated to.

Figure 1:
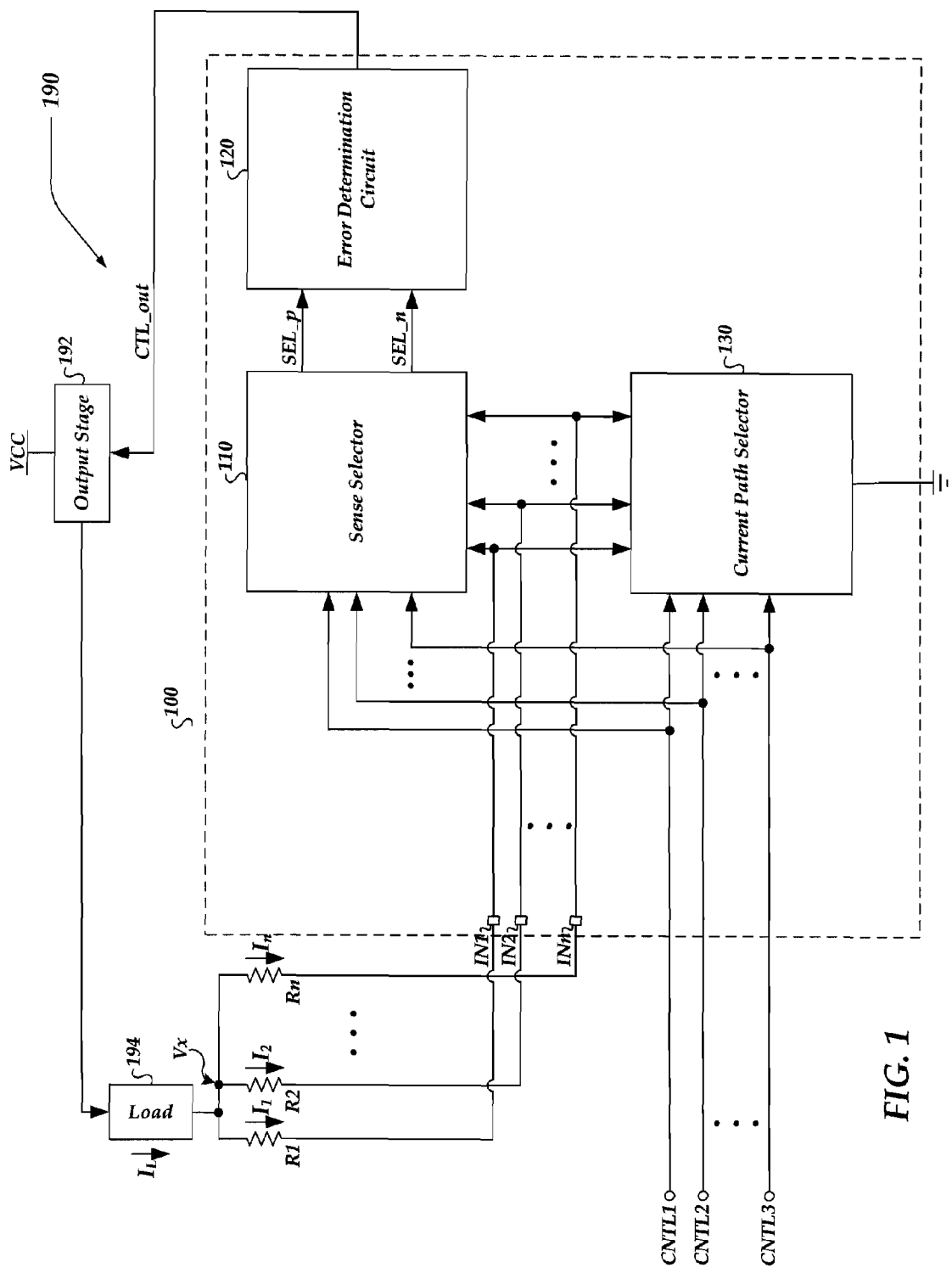
FIG. 1 is a block diagram of a regulation system according to an embodiment of the present invention.

FIG. 1 is a block diagram of an embodiment of regulation system 190. Regulation system 190 includes circuit 100, output stage 192, load 194, and resistors R1-Rn.

Regulation system 190 is arranged to selectively regulate load current $I_L$ at one value from a plurality of defined values based, at least in part, on a selection of a resistance value associated with a current pathway through the load. For example, circuit 100 may be arranged to enable a current pathway to ground through one or more of resistors R1-Rn. In this example, the resistance of the selected current pathway may substantially define the value at which load current $I_L$ is regulated to.

Circuit 100 controls, at least in part, the regulation of load current $I_L$. In one embodiment, circuit 100 includes sense selector 110, error determination circuit 120, and current path selector 130. In the illustrated embodiment, circuit 100 has inputs IN1-INn. Further, circuit 100 is arranged to receive control signals CNTL1-CNTLn. Sense selector 110 receives sense signals via inputs IN1-INn and current path selector 130 receives currents via inputs IN1-INn. Further, circuit 100 is arranged to provide power regulation control signal CTL_out. As discussed below, power regulation control signal CTL_out is employed by output stage 192 to regulate load current $I_L$.

Sense selector 110 is arranged to receive signals CNTL1-CNTLn as control signals and to receive sense signals via inputs IN1-INn. Sense selector 110 is further arranged to provide comparison signals SEL_p and SEL_n to error determination circuit 120. In one embodiment, comparison signals SEL_p and SEL_n are primarily based upon the voltage value(s) on one or more of the sense signals received via inputs IN1-INn that have been selected. The selection of the one or more of the sense signals received via inputs IN1-INn may be based on the values of control signals CNTL1-CNTLn.

Error determination circuit 120 is arranged to receive comparison signals SEL_p and SEL_n and to provide power regulation control signal CTL_out based, at least in part on, a difference between comparison signals SEL_p and SEL_n. Comparison signals SEL_p and SEL_n may comprise a differential signal pair, may be two sets of differential signal pairs, may be unrelated single-ended signals, and/or the like. In other embodiments, sense selector 110 and error determination circuit 120 may be arranged to provide and receive, respectively, more or less comparison signals. In one embodiment, comparison signal SEL_n is provided by coupling a selected one of the sense signals received via inputs IN1-INn to error determination circuit 120. In the same or other embodiments, error determination input signal SEL_p is tied to ground.

Current path selector 130 is arranged to receive control signals CNTL1-CNTLn and to receive current paths via inputs IN1-INn. In one embodiment, current path selector 130 is arranged to selectively couple inputs IN1-INn as current paths to a supply voltage potential, such as ground. For example, the selective coupling may be based on the values on control signals CNTL1-CNTLn. In other embodiments, current path selector 130 may be arranged to selectively couple inputs IN1-INn as current path inputs to a supply voltage potential other than ground. These other supply voltage potentials may be positive or negative, and may also be a variable voltage or a substantially fixed voltage.

Output stage 192 is arranged to receive control signal CTL_out and input power source VCC to provide regulated load current $I_L$ to load 194. In one embodiment, output stage 192 includes switching boost regulation circuitry which provides an output voltage that is in the range of about 10-15 volts. For example, in one embodiment, output stage 192 is operable to drive a string of three white light emitting diodes (LEDs) having a forward voltage drop that is in the range of about three-four volts each. However, output stage 192 may be any output stage that is suitable to provide power to the load of each system. For instance, output stage 192 may also include buck regulation circuitry, buck-boost regulation circuitry, inverting regulation circuitry, fly-back conversion circuitry, and/or the like, and may include synchronous or asynchronous rectification circuitry. Further, output stage 192 may include pulse width modulation (PWM), pulse frequency modulation (PFM), hysteretic, constant-on-time, and/or the like, regulation circuitry. In addition, output stage 192 may also include linear, a low dropout, and/or the like, regulation circuitry.

Load 194 may be any electrical load through which electrical current flows. For example, load 194 may be an electronic device or circuit such as a computer, television, mobile device, wireless device, illumination device, phase lock loop, motor, and/or the like. In one embodiment, load 194 is a LED, a string of LEDs, array of LEDs, other illumination device, and/or the like. In this embodiment, regulation system 190 may be employed to regulate the current through illumination device load 194 such that the illumination device can provide illumination at multiple intensity levels. For example, if employed with a photography system, these intensity levels may include an "off" level, a "preview" level, and a "flash" level. If employed with a television display, computer monitor, mobile device display, and/or the like, these intensity levels may provide multiple display intensity setting to optimize between brightness and power consumption. These and other applications are within the spirit and scope of the invention.

In one embodiment, current pathways from load 194 to ground are provided through resistors R1-Rn. In one embodiment, each of resistors R1-Rn may serve as a current sense resistor such that load current $I_L$ can be determined based on the voltage across the current sense resistor. Further, another of resistors R1-Rn may serve to provide a sense signal that is primarily based upon the voltage across the current sense resistor. In one embodiment, resistors R1-Rn have resistance values that are in the range of about 10-20 ohms. However, other resistance values may be instead selected to regulate load current $I_L$ at any desired value. In other embodiments, a variable resistance may be employed in place of one or more of resistors R1-Rn. For example, a single variable resistance such as a potentiometer, a digitally controlled variable resistance, and/or the like, may be employed to provide a current pathway to ground.

In at least one embodiment, regulation control system 190 differs from the illustrated embodiment. For example, output stage 192 may be integrated with circuit 100; output stage 192 may be coupled to a different positive or negative supply voltage potential; differing numbers of inputs IN1-INn, control signals CNTL1-CNTLn, and resistors R1-Rn may be employed, and/or the like.

Figure 2:
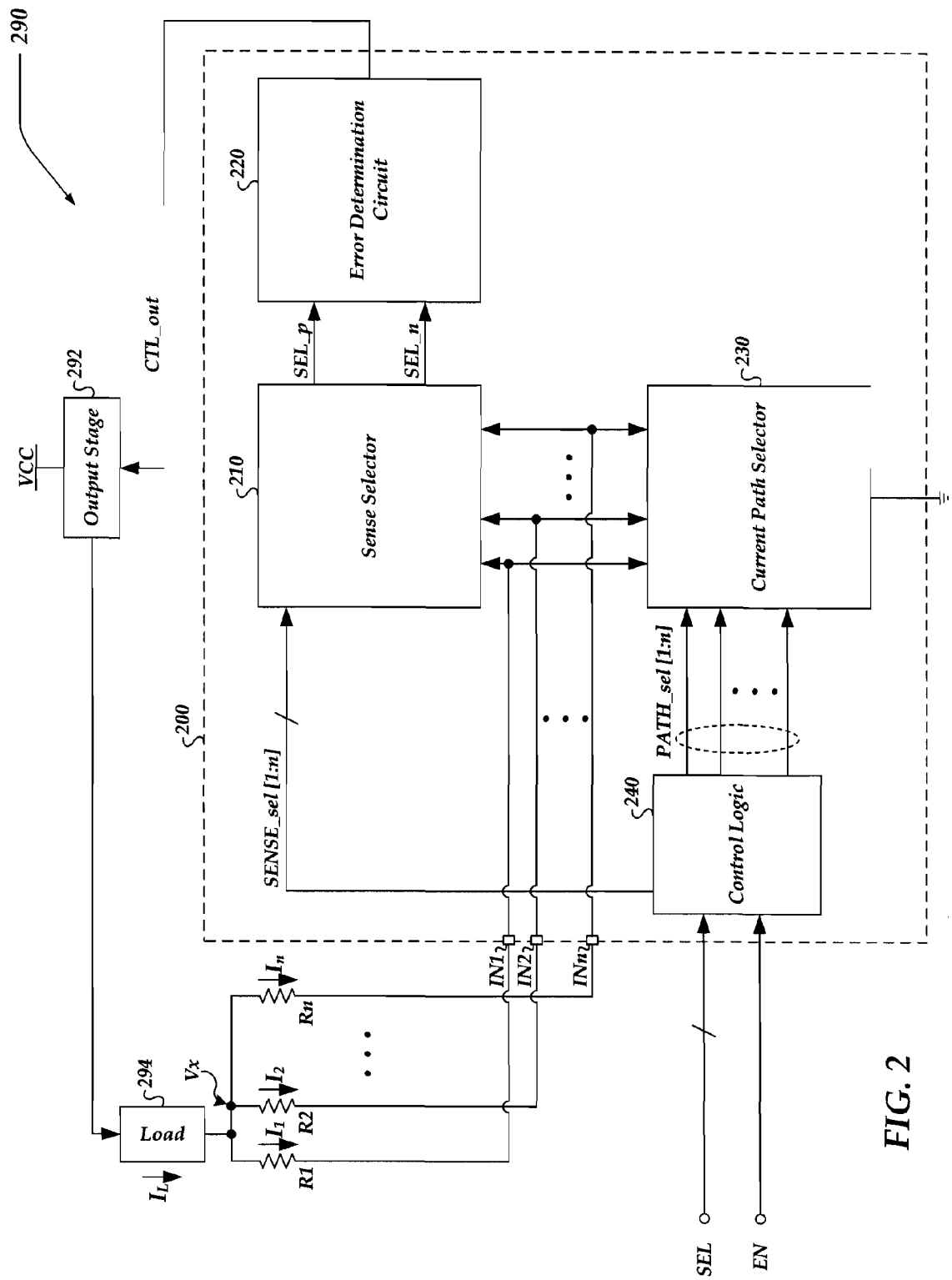
FIG. 2 is a block diagram of a regulation system according to another embodiment of the present invention.

FIG. 2 is a block diagram of an embodiment of regulation system 290. Regulation system 290 may be employed as an embodiment of regulation system 190 of FIG. 1 and further includes control logic 240. As illustrated, circuit 200 has inputs IN1-INn. Further, circuit 200 is arranged to receive enable signal EN, and selection control signal bus SEL. In one embodiment, control logic 240 is arranged to receive enable signal EN and to receive selection control signal bus SEL. Control logic 240 is further arranged to provide control signals SENSE_sel[1:n] to sense selector 210, and to provide control signals PATH_sel[1:n] to current path selector 230. In one embodiment, enable signal EN is employed to gate or otherwise control the assertion of control signals SENSE_sel[1:n] and PATH_sel[1:n] such that they are not asserted unless enable signal EN is asserted. Also, selection control bus SEL may be employed by control logic 240 to determine a selected sense signal and a selected current pathway. Selection control signal bus SEL may be either a single signal or multiple signals.

Figure 3:
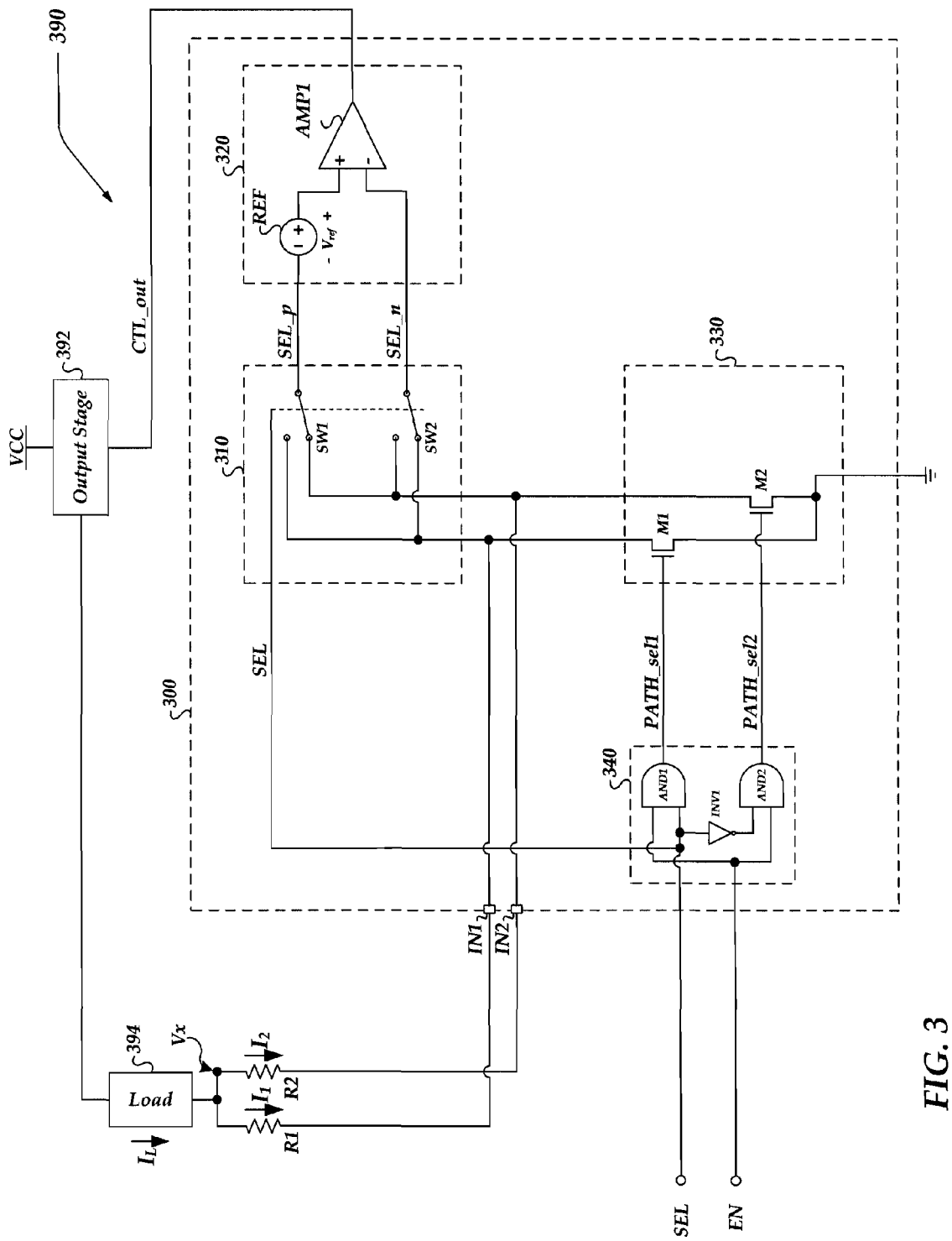
FIG. 3 is a block diagram of a regulation system according to yet another embodiment of the present invention.

FIG. 3 is a block diagram of an embodiment of regulation system 390. Circuit 300 may be employed as an embodiment of circuit 200 of FIG. 2.

Sense selector 310 is arranged to receive sense signals via inputs IN1 and IN2 and includes switches SW1 and SW2 which are arranged to selectively couple inputs IN1 and IN2 to comparison signals SEL_p and SEL_n, respectively. In this embodiment, switches SW1 and SW2 are commonly controlled by selection control signal SEL such that while input IN1 is coupled to signal SEL_p, input IN2 is coupled to SEL_n. Further, while input IN2 is coupled to signal SEL_p, input IN1 is coupled to SEL_n as a sense signal. However, in other embodiments, switches SW1 and SW2 may be either independently or commonly controlled.

Switches SW1 and SW2 may be any type of switch circuit. In one embodiment, switches SW1 and SW2 are electronically controlled double pole switches. For example, N-channel MOSFET devices, P-channel MOSFET devices, BJT transistors, JFET transistors, relays, and/or the like and combinations thereof, may be employed to form switches SW1 and SW2.

Error determination circuit 320 includes reference voltage source REF and amplifier AMP1. In one embodiment, reference source REF provides a reference voltage $V_{ref}$ such that the voltage at its positive terminal that is approximately 150-500 millivolts higher than the voltage at the negative terminal of reference source REF. A bandgap reference circuit, shunt type reference, and/or the like, may be employed as reference source REF. Amplifier AMP1 is arranged to provide power regulation control signal CTL_out based on the difference between its inverting and non-inverting inputs. Amplifier AMP1 may be an operational amplifier, operational amplifier circuit, error amplifier, differential amplifier, and/or the like. Further, in some embodiments, amplifier AMP1 is a comparator, such as a PFM comparator, that is arranged to provide a two-state output based on the relative values of the inverting and non-inverting inputs.

In other embodiments, reference source REF may be an external reference source. In yet further embodiments, the negative terminal of reference source REF is connected to voltage potential, such as ground. These variations are within the spirit and scope of the invention.

Current path selector 330 includes transistors M1 and M2 and is arranged to selectively couple inputs IN1 and IN2, as current pathway inputs, and terminals of switches SW1 and SW2 to ground. In one embodiment, transistors M1 and M2 are N-channel MOSFET devices. However, P-channel MOSFET devices, BJT transistors, JFET transistors, relays, and/or the like, and combinations thereof, may be employed instead of, or in addition to, transistors M1 and M2.

Control logic 340 includes AND gates AND1-AND2 and inverter INV1. In the illustrated embodiment, control logic 340 asserts signal PATH_sel1 to close transistor M1 while enable signal EN is high and selection control signal SEL is high. Also, control logic 340 asserts signal PATH_sel2 to close transistor M2 while enable signal EN is high and selection control signal SEL is low. As illustrated, transistors M1 and M2 are both open when enable EN is low. For example, when enable signal EN is low, load current $I_L$ is substantially zero and output stage 392 is substantially off.

In other embodiments, control logic 340 performs other similar and dissimilar functions. For instance, control logic 340 may be modified to control more than two current paths and/or selection switches, or to base its outputs on other internal or external factors, controls, or conditions. Control logic 340 may further include break before make logic to ensure that transistors M1 and M2 are not both closed at the same time. Control logic 340 may also include flip-flops, state machines, microcontrollers, microprocessors, combinatorial logic, programmable logic, and/or the like.

In operation, regulation system 390 regulates load current $I_L$ at one of two selected values. For example, while enable signal EN and selection control signal SEL are high, signal PATH_sel1 is asserted to close transistor M1, and signal PATH_sel2 is deasserted to open transistor M2. Further, switches SW1 and SW2 are switched to couple input IN1 to signal SEL_p to and to the negative input of reference source REF and to couple input IN2, as a sense signal, to signal SEL_n and to the inverting input of amplifier AMP1. In certain embodiments, the $R_{DSon}$ of transistor M1 does not affect the output of circuit 300 as error determination circuit 320 is arranged to sense the voltage across resistor R1.

During this time, current $I_1$ flows from output stage 392, through load 394, resistor R1, and transistor M1 to ground and is approximately equal to load current $I_L$. Also during this time, current $I_2$ and the voltage across resistor R2 are approximately zero. Accordingly, the voltage at the inverting input of amplifier AMP1 is substantially equal to the voltage at node Vx and is related to load current $I_L$. Thus, regulation system 390 regulates load current $I_L$ such that the voltage across resistor R1 is substantially equal to voltage $V_{ref}$ and load current $I_L$ is substantially equal to $V_{ref}/R1$.

Likewise, while enable signal EN is high and selection control signal SEL is low, transistor M1 is open, transistor M2 is closed, and switches SW1 and SW2 are switched to couple input IN2 to signal SEL_p and to couple input IN1, as a sense signal, to signal SEL_n and to the inverting input of amplifier AMP1. In certain embodiments, the $R_{DSon}$ of transistor M2 does not affect the output of circuit 300 as error determination circuit 320 is arranged to sense the voltage across resistor R2. During this time, regulation system 390 regulates load current $I_L$ such that the voltage across resistor R2 is substantially equal to voltage $V_{ref}$ and load current $I_L$ is substantially equal to $V_{ref}/R2$. While enable signal EN is low, both transistors M1 and M2 are open and load current $I_L$ is substantially zero.

Figure 4:
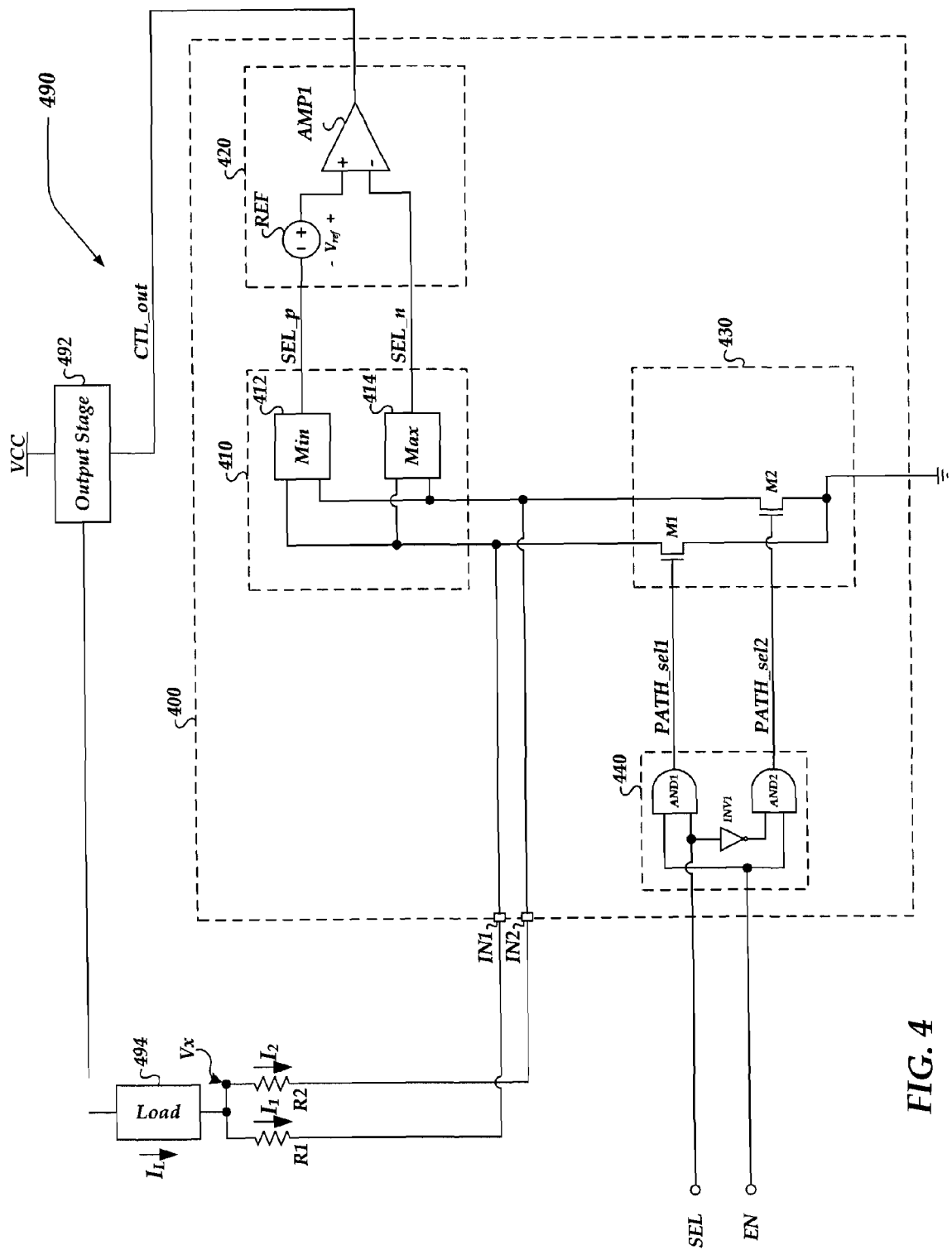
FIG. 4 is a block diagram of a regulation system according to a further embodiment of the present invention.

FIG. 4 is a block diagram of an embodiment of regulation system 490. Circuit 400 may be employed as an embodiment of circuit 200 of FIG. 2.

Sense selector 410 is arranged to receive sense signals via inputs IN1 and IN2 to provide comparison signals SEL_p and SEL_n. Sense selector 410 includes minimum selector 412 and maximum selector 414. In one embodiment, minimum selector 412 is arranged to selectively couple the negative terminal of reference source REF to the sense signal which has the lowest voltage. Likewise, maximum selector 412 is arranged to couple the inverting terminal of amplifier AMP1 to the sense signal which has the highest voltage. For example, minimum selector 412 and maximum selector 414 enable sense selector 410 to provide comparison signals SEL_p and SEL_n based on whether transistors M1 and M2 are opened or closed without receiving an additional selection control signal.

Figure 5:
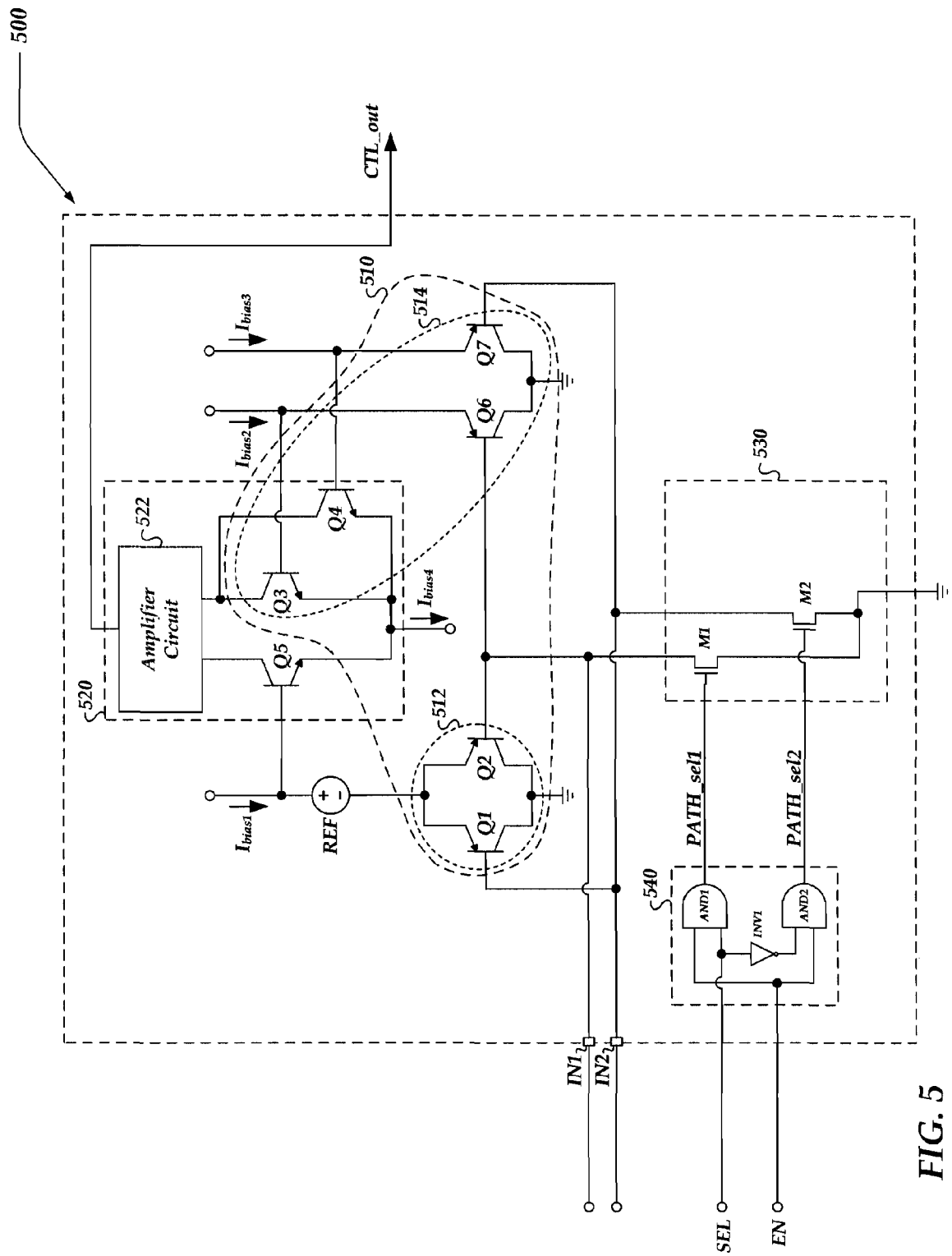
FIG. 5 is a schematic diagram of the circuit of FIG. 4 according to an embodiment of the present invention.

FIG. 5 is a schematic diagram of an embodiment of circuit 500. Circuit 500 may be employed as an embodiment of circuit 400 of FIG. 4.

Sense selector 510 includes minimum selector 512 and maximum selector 514. In one embodiment, PNP transistors Q1 and Q2 function as minimum selector 512 and are operable to provide a ground connection to the negative terminal of reference source REF, based on the smaller of the sense signals provided via inputs IN1 and IN2. Also, transistors Q3-Q6 functions as maximum selector 514 and are operable to provide a signal based on the larger of the sense signals provided via inputs IN1 and IN2. In this embodiment, transistors Q3 and Q4 additionally function as part of an input stage of an amplifier, such as amplifier AMP1 of FIG. 4. In one embodiment, PNP transistors Q6 and Q7 also function to bias the bases of NPN transistors Q3 and Q4, respectively, to offset the base-emitter voltage of PNP transistors Q1 and Q2 of minimum selector 512.

Error determination circuit 520 includes amplifier circuit 522 and NPN transistors Q3-Q5. As discussed above, NPN transistors Q3 and Q4 function as part of an input stage of an amplifier circuit. In one embodiment, transistor Q5 also operates in conjunction with transistors Q3 and Q4 to form a differential pair input stage of an amplifier. Amplifier circuit 522 may be a second stage of an amplifier, such as amplifier AMP1 of FIG. 4. For example, amplifier circuit 522 may include additional differential pairs, cascode amplifiers, differential-to-single ended converters, and/or the like. In certain embodiments, amplifier circuit 522 is a complete amplifier, such as an operational amplifier, an error amplifier, and/or the like.

Throughout FIG. 5, transistors Q1-Q7 are described as bipolar transistors. However, MOSFETs, JFETS, and/or the like, may also be suitably used with minor circuit modifications. These other embodiments are within the spirit and scope of the invention.

Bias current $I_{bias1}$-$I_{bias4}$ may be bias currents of any suitable value and may be provided by either an internal or an external current source. In one embodiment, bias currents $I_{bias1}$-$I_{bias4}$ are provided internally by current mirror current sources.

Figure 6:
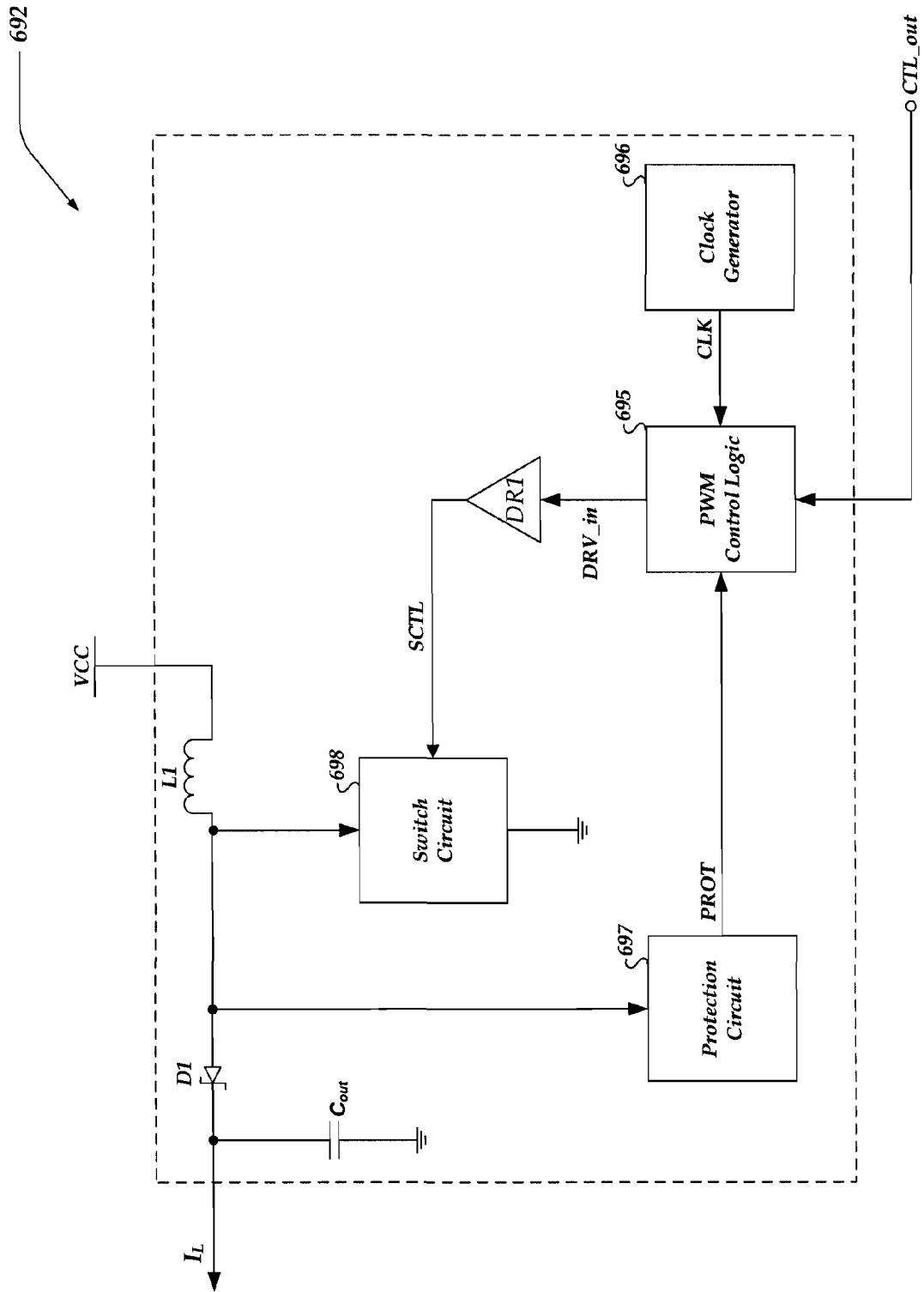
FIG. 6 is a block diagram of an output stage according to an embodiment of the present invention.

FIG. 6 is a block diagram of an embodiment of output stage 692. Output stage 692 may include switch circuit 698, PWM control logic 695, protection circuit 697, clock generator 696, driver DR1, inductor L1, diode D1, and capacitor $C_{out}$. Output stage 692 may be employed as an embodiment of output stage 192 of FIG. 1 Output stage 692 is arranged to receive control signal CTL_out and a supply voltage potential, such as VCC, to provide regulated load current $I_L$ to a load.

In the illustrated embodiment, output stage 692 is a portion of PWM controlled switching boost regulator. In other embodiments, output stage 692 may be any output stage that is suitable to provide power to the load of a system. As discussed above, suitable output stages may be either switching regulation output stages, linear regulation output stages, and/or the like.

In one embodiment, PWM control circuit 695 is arranged modulate driver input signal DRV_in to driver DR1 based, at least in part, on power regulation control signal CTL_out, protection status signal PROT, and clock signal CLK.

Clock generator 696 is arranged to provide PWM clock signal CLK to PWM control logic 695. Clock generator 696 may be either an internal clock generator or an external clock generator. Clock generator 696 may provide a clock signal of any frequency and duty cycle that is suitable for use in performing PWM regulation.

In some embodiments, protection circuit 697 is arranged to suppress and/or modify the output of PWM control logic 695 when certain conditions are detected. For example, protection circuit 697 may include over-voltage protection, under-voltage protection, over-current protection, under-current protection, temperature protection, battery status monitoring, and/or the like.

In one embodiment, driver circuit DR1 is provided to drive switch circuit 698 based on driver input signal DRV_in, and switch circuit 698 includes an N-channel MOSFET switching device. However, in other embodiments, driver circuit DR1 may be omitted or P-channel MOSFET devices, BJT transistors, JFET transistors, and/or the like, and combinations thereof, may be suitably employed in switch circuit 698.

Inductor L1, diode D1, and capacitor $C_{out}$ may be of any suitable types or values for use with power regulation.

In some embodiments, output stages may differ from the illustrated embodiment. For example, output stages of linear regulation systems may include one or more pass transistors, output stages of a PFM controlled regulation systems may include a PFM control circuit, and/or the like.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for current regulation, comprising:
   an error determination circuit having at least a first input and an output, wherein the error determination circuit is arranged to provide an error signal at the output based, at least in part, on the difference between a value of a signal at the first input and a reference voltage;
   a sense selector that is arranged to select a sense signal from a plurality of sense signals, and to selectively couple the selected sense signal to the first input of the error determination circuit, wherein the selected sense signal is based, at least in part, on a current through a load; and
   a current path selector that is arranged to selectively enable a selected current pathway from a plurality of current pathways, wherein the circuit is arranged such that the current through the load is regulated based, at least in part, on a resistance associated with the selected current pathway, wherein the circuit is arranged to enable the current through the load to be regulated to a selected one of a plurality of different independent values.

2. The circuit of claim 1, wherein the circuit enables the current through the load to be regulated to one of multiple different independent values based on exactly one reference voltage, and wherein the number of multiple different independent values is an integer that is greater than one.

3. The circuit of claim 1, wherein the load includes at least one of a light emitting diode circuit or an electroluminescent circuit, and wherein the circuit enables regulation of an illumination intensity associated with the light emitting diode circuit or the electroluminescent circuit.

4. The circuit of claim 1, wherein the error determination circuit includes:
   an amplifier circuit having at least a first input, a second input, and an output, wherein the amplifier circuit is arranged to provide the error signal at the output based, at least in part, on the difference between the value of the signal at the first input and a value of a reference voltage at the second input; and
   a reference source that is arranged to provide the reference voltage to the second input of the amplifier circuit.

5. The circuit of claim 4, wherein the reference source is arranged to provide a reference voltage having a magnitude that is in a range of about 150 millivolts to 500 millivolts.

6. The circuit of claim 1, wherein the current path selector includes:
   a first switch; and
   a second switch, wherein the circuit is arranged such that:
      while the first switch is closed and the second switch is open, the current through the load flows through the first switch to a supply voltage potential; and
      while the second switch is closed and the first switch is open, the current through the load flows through the second switch to the supply voltage potential.

7. The circuit of claim 6, wherein the current path selector is arranged such that:
   while both the first switch and the second switch are both open, the current through the load is substantially zero.

8. The circuit of claim 1, further comprising:
   an output stage having at least a control input, a power input, and a power output, wherein the output stage is arranged to receive the output of the error determination circuit at the control input; is arranged to provide the current through the load; and is arranged such that the power provided at the power output is based, at least in part, on the value of the control input.

9. The circuit of claim 8, wherein the output stage includes switched mode boost conversion circuitry.

10. The circuit of claim 1, wherein the sense selector is arranged to select the selected sense signal based, at least in part, on the selected current pathway.

11. The circuit of claim 1, wherein the circuit is arranged to regulate the current at one of N different independent values based on a reference voltage, wherein N is an integer that is greater than 1.

12. The circuit of claim 1, wherein each of the plurality of different independent values corresponds to a separate one of the plurality of current pathways, and wherein the selected one of the plurality of different independent values is selectively enabled by selectively enabling the current pathway of the plurality of current pathways that corresponds to the selected one of the plurality of different independent values.

13. A circuit for current regulation, comprising:
an error determination circuit having at least a first input and an output, wherein the error determination circuit is arranged to provide an error signal at the output based, at least in part, on the difference between a value of a signal at the first input and a reference voltage;
a sense selector that is arranged to select a sense signal from a plurality of sense signals, and to selectively couple the selected sense signal to the first input of the error determination circuit, wherein the selected sense signal is based, at least in part, on a current through a load; and
a current path selector that is arranged to selectively enable a selected current pathway from a plurality of current pathways, wherein the circuit is arranged such that the current through the load is regulated based, at least in part, on a resistance associated with the selected current pathway; and wherein the error determination circuit includes:
an amplifier circuit having at least a first input, a second input, and an output, wherein the amplifier circuit is arranged to provide the error signal at the output based, at least in part, on the difference between the value of the signal at the first input and a value of a reference voltage at the second input; and
a reference source that is arranged to provide the reference voltage to the second input of the amplifier circuit, wherein the sense selector is arranged to selectively couple a supply voltage potential to the reference source such that an intrinsic resistance of the current path selector does not substantially affect the regulation of the current through the load.

14. The circuit of claim 13, wherein the sense selector includes:
a minimum selector that is arranged to compare the magnitude of voltages at each of the plurality of sense signals, and to couple the sense signal having the smallest magnitude to the reference source as the supply voltage potential, and wherein the supply voltage potential is a ground reference.

15. A circuit for current regulation, comprising:
an error determination circuit having at least a first input and an output, wherein the error determination circuit is arranged to provide an error signal at the output based, at least in part, on the difference between a value of a signal at the first input and a reference voltage;
a sense selector that is arranged to select a sense signal from a plurality of sense signals, and to selectively couple the selected sense signal to the first input of the error determination circuit, wherein the selected sense signal is based, at least in part, on a current through a load;
a current path selector that is arranged to selectively enable a selected current pathway from a plurality of current pathways, wherein the circuit is arranged such that the current through the load is regulated based, at least in part, on a resistance associated with the selected current pathway; and wherein the current path selector includes:
a first switch; and
a second switch, wherein the circuit is arranged such that:
while the first switch is closed and the second switch is open, the current through the load flows through the first switch to a supply voltage potential; and
while the second switch is closed and the first switch is open, the current through the load flows through the second switch to the supply voltage potential;
a first resistor that is associated with the first switch; and
a second resistor that is associated with the second switch, wherein the first resistor and the second resistor are arranged such that:
while the first switch is closed and the second switch is open, the selected sense signal is provided through the second resistor and the current through the load flows through the first resistor and the first switch to a supply voltage potential; and
while the second switch is closed and the first switch is open, the selected sense signal is provided through the first resistor and the current through the load flows through the second resistor and the second switch to a supply voltage potential.

16. A circuit for current regulation, comprising:
an error determination circuit having at least a first input and an output, wherein the error determination circuit is arranged to provide an error signal at the output based, at least in part, on the difference between a value of a signal at the first input and a reference voltage;
a sense selector that is arranged to select a sense signal from a plurality of sense signals, and to selectively couple the selected sense signal to the first input of the error determination circuit, wherein the selected sense signal is based, at least in part, on a current through a load; and
a current path selector that is arranged to selectively enable a selected current pathway from a plurality of current pathways, wherein the circuit is arranged such that the current through the load is regulated based, at least in part, on a resistance associated with the selected current pathway; and wherein the sense selector is arranged to select the selected sense signal based, at least in part, on the selected current pathway, and wherein the sense selector includes:
a maximum selector circuit that is arranged to compare the magnitude of voltages at each of the plurality of sense signals, and provide the sense signal having the largest magnitude as the selected sense signal.

17. A method of current regulation, comprising:
receiving a reference voltage signal;
selecting a sense signal from a plurality of sense signals;
providing an error signal based, at least in part, on the selected sense signal and the reference voltage signal;
selecting a current pathway from a plurality of current pathways, wherein each current pathway is associated with a resistance value, and wherein a value of the sense signal is based, at least in part, on the resistance associated with the selected current pathway;

regulating the current through the load based, at least in part, on the error signal, such that the current is regulated to a selected one of a plurality of different independent values.

18. The method of claim 17, wherein regulating current through the load includes:
regulating the current through the load at one of N different independent values based on a reference voltage, and wherein N is an integer that is greater than 1; and
regulating the current through the load at another of the N different independent values based on the reference voltage.

19. A method of current regulation, comprising:
receiving a reference voltage signal;
selecting a sense signal from a plurality of sense signals;
providing an error signal based, at least in part, on the selected sense signal and the reference voltage signal;
selecting a current pathway from a plurality of current pathways, wherein each current pathway is associated with a resistance value, and wherein a value of the sense signal is based, at least in part, on the resistance associated with the selected current pathway; and
regulating the current through the load based, at least in part, on the error signal wherein selecting the sense signal includes:
closing a first switch and opening a second switch such that the selected sense signal is provided through a resistance associated with the second switch.

20. A method of current regulation, comprising:
receiving a reference voltage signal;
selecting a sense signal from a plurality of sense signals;
providing an error signal based, at least in part, on the selected sense signal and the reference voltage signal;
selecting a current pathway from a plurality of current pathways, wherein each current pathway is associated with a resistance value, and wherein a value of the sense signal is based, at least in part, on the resistance associated with the selected current pathway; and
regulating the current through the load based, at least in part, on the error signal, wherein selecting the current pathway includes:
closing a first switch and opening a second switch such that, the current through the load flows through the first switch to a supply voltage potential.

21. A circuit for current regulation, comprising:
an amplifier having at least a first input, a second input, and an output, wherein the amplifier is arranged to provide an amplified signal at the output based, at least in part, on the difference between a value of a signal at the first input and a value of a signal at the second input, wherein the second input of the amplifier is arranged to receive a signal that is based, at least in part, on the value of a reference voltage;
a first plurality of switches that are arranged to selectively couple the first input of the amplifier to a selected intermediate node from a plurality of intermediate nodes; and
a second plurality of switches that are arranged to selectively couple another intermediate node from the plurality of intermediate nodes to a supply voltage potential such that a current pathway through a load is selected, wherein the circuit is arranged such that the current through the load is regulated based, at least in part, on a resistance associated with the selected current pathway, and such that the current through the load is regulated to a selected one of a plurality of different independent values.

22. A circuit for current regulation, comprising:
an amplifier having at least a first input, a second input, and an output, wherein the amplifier is arranged to provide an amplified signal at the output based, at least in part, on the difference between a value of a signal at the first input and a value of a signal at the second input, wherein the second input of the amplifier is arranged to receive a signal that is based, at least in part, on the value of a reference voltage;
a first plurality of switches that are arranged to selectively couple the first input of the amplifier to a selected intermediate node from a plurality of intermediate nodes;
a second plurality of switches that are arranged to selectively couple another intermediate node from the plurality of intermediate nodes to a supply voltage potential such that a current pathway through a load is selected, wherein the circuit is arranged such that the current through the load is regulated based, at least in part, on a resistance associated with the selected current pathway; and
a maximum selector circuit that is arranged to compare the magnitude of voltages at each of the plurality of intermediate nodes, and to control the first plurality of switches such that the first input of the amplifier is coupled to the intermediate node of the plurality of intermediate nodes having the largest voltage magnitude.

23. A circuit for current regulation, comprising:
an error determination circuit having at least a first input and an output, wherein the error determination circuit is arranged to provide an error signal at the output based, at least in part, on the difference between a value of a signal at the first input and a reference voltage;
a sense selector that is arranged to select a sense signal from a plurality of sense signals, and to selectively couple the selected sense signal to the first input of the error determination circuit, wherein the selected sense signal is based, at least in part, on a current through a load; and
a current path selector that is arranged to selectively enable a selected current pathway from a plurality of current pathways, wherein the circuit is arranged such that the current through the load is regulated based, at least in part, on a resistance associated with the selected current pathway, each of the plurality of current pathways has a different associated resistance, and wherein the current to which the load is regulated is different depending on which of the plurality of current pathways is currently selected.

* * * * *

UNITED STATES PATENT AND TRADEMARK OFFICE
CERTIFICATE OF CORRECTION

| | | |
|---|---|---|
| PATENT NO. | : 7,863,869 B1 | Page 1 of 1 |
| APPLICATION NO. | : 11/749696 | |
| DATED | : January 4, 2011 | |
| INVENTOR(S) | : Frank De Stasi | |

It is certified that error appears in the above-identified patent and that said Letters Patent is hereby corrected as shown below:

On the Title Page, in field (56), under (Other Publications), in column 2, line 8, delete "Techonology," and insert -- Technology, --, therefor.

Title Page 2, in field (56), under (Other Publications), in column 1, line 3, delete "Enineering," and insert -- Engineering, --, therefor.

Title Page 2, in field (56), under (Other Publications), in column 2, line 1, delete "Univeristy," and insert -- University, --, therefor.

Signed and Sealed this
Fifteenth Day of November, 2011

David J. Kappos
*Director of the United States Patent and Trademark Office*